Jan. 27, 1931.　　　　E. W. BOERSTLER　　　　1,790,086
APPARATUS FOR PROJECTING LIGHT RAYS
Filed Nov. 6, 1925
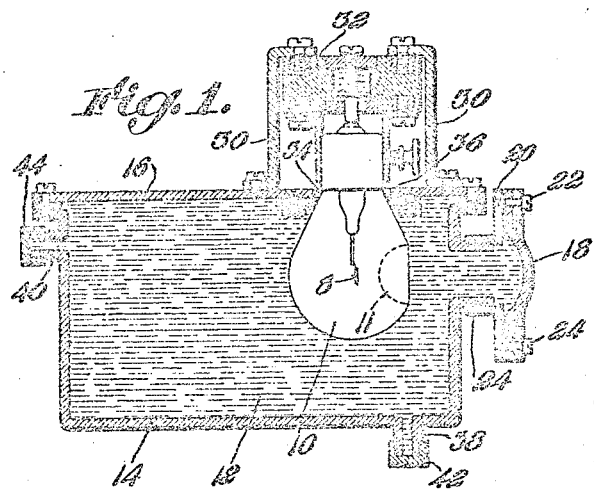
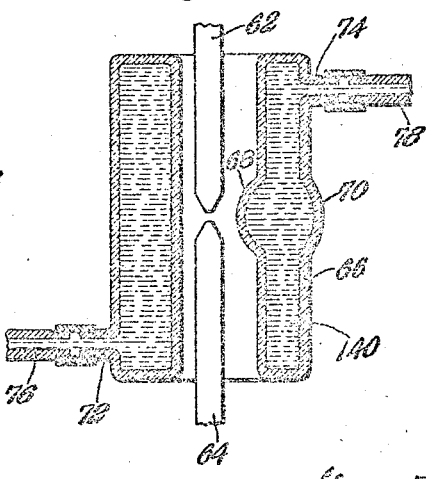
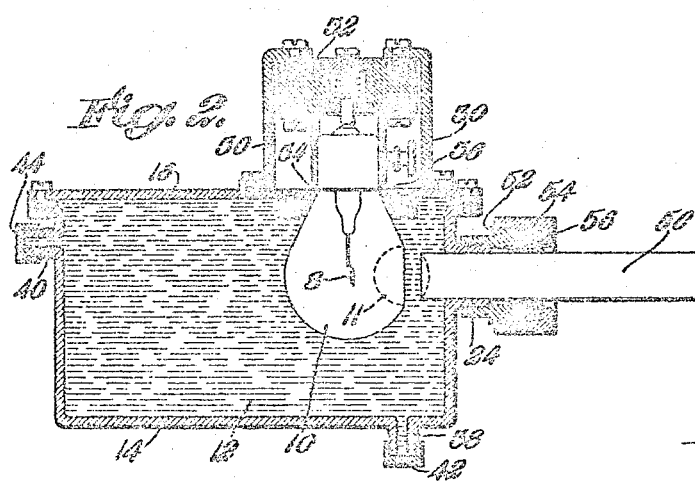
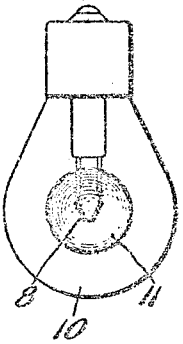
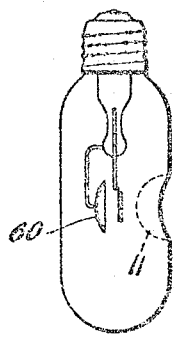
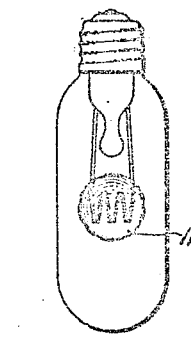
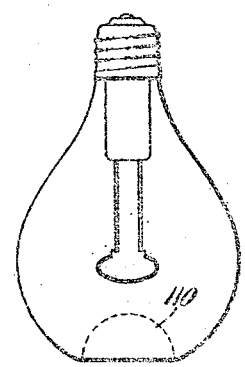

Patented Jan. 27, 1931

1,790,086

UNITED STATES PATENT OFFICE

EDWARD W. BOERSTLER, OF WATERTOWN, MASSACHUSETTS

APPARATUS FOR PROJECTING LIGHT RAYS

Application filed November 6, 1925. Serial No. 67,389.

The present invention relates to apparatus for projecting light rays.

The usual forms of apparatus for projecting concentrated beams of light possess the disadvantage that the refracting or transmitting medium by which the rays are focused or conducted can not be placed sufficiently close to the source of light to utilize the maximum intensity of the rays emanating from the source. This is particularly true when the source consists of an incandescent lamp which is usually formed with a bulb or envelope of considerable diameter and which, therefore, necessitates placing the refracting or transmitting medium at a distance from the incandescent filament at least equal to the radius of the bulb. Inasmuch as the intensity of light emitted from the source varies inversely as the square of the distance from the source, the maximum intensity which the source is capable of giving is not utilized, a large portion of the light being dispersed before it enters the lens. Moreover, large projectors are open to the disadvantage that the proximity of the lens to the source is limited by the heat which is developed by the intense beam of rays given off by the source. It is, therefore, necessary that the lens be placed at a sufficient distance from the lamp to avoid the destructive action of the heat and this results in a considerable diminution of the intensity of useful light obtainable from a given lamp. The factor of heat generation is particularly important in such apparatus as motion picture projectors where the film must not be excessively heated, and also in apparatus for utilizing the therapeutic properties of the rays of the invisible spectrum, wherein the generation of heat requires a limitation of the useful volume of the desired rays.

The objects of the present invention are to provide an apparatus by which the light refracting or transmitting medium may be placed sufficiently close to the source of light to utilize the increased intensity of the rays, and also to provide for the absorption of the heat which may be generated by the intense concentration of the emanations from the source of light.

With these objects in view, one feature of the invention comprises a source of light having a containing bulb or envelope which is formed with a depression extending toward the source of light and which is adapted to permit placing the refracting or conducting medium at a position close to the source. The depression not only serves the purpose of permitting the refracting medium to be placed in a position of high concentration of light rays, but also may be shaped to determine a lens shaped contour of the refracting substance so that any desired optical effects may be obtained.

Another feature of the invention consists in the employment of a liquid body which acts as the refracting medium for the lens and which surrounds the source of light in order that the heat generated may be absorbed. The liquid body is preferably of considerable magnitude in comparison with that of the source, in order to permit a natural circulation by which the most intense heat generated in the refracting portion of the medium may be carried off by convection currents and dispersed by radiation. Moreover, where natural circulation in the fluid body is insufficient to provide the necessary cooling action, the construction permits a forced circulation of liquid from an external source.

In the accompanying drawings, Fig. 1 is a sectional elevation showing one form of apparatus embodying the features of the present invention; Fig. 2 is a sectional elevation of a modified form of the invention shown in Fig. 1; Fig. 3 is a front view of the incandescent lamp shown in Figs. 1 and 2; Fig. 4 is a side elevation of a form of incandescent lamp employing a reflector; Fig. 5 is a front elevation of the lamp shown in Fig. 4; Fig. 6 is an elevation of a modified type of lamp; and Fig. 7 is a sectional elevation of an apparatus embodying the features of the present invention and employing a carbon arc for the source of light.

The invention is herein illustrated and described as embodied in projecting apparatus employing two types of light sources, one an incandescent lamp and the other a carbon arc. The incandescent lamp has its bulb formed with a depression to receive the refracting medium which may be either liquid or solid to provide a lens at a point of intense concentration of the light rays, it being preferred to employ a liquid refracting medium where a high candle power lamp is used in order to absorb the heat generated by the filament. The carbon arc type of projector employs carbon electrodes which is surrounded by a cooling liquid in a suitable container which is formed so as to present lens shaped surfaces opposite the arc to confine a portion of the refracting medium of such shape as to give the desired focus to the rays emitted by the arc.

The apparatus shown in Fig. 1 comprises a source of light consisting of an incandescent lamp having a filament 8 and a glass bulb or envelope 10. The envelope is formed with a depression 11 either by molding or blowing according to any usual or preferred method. The depression is formed so that the wall of the bulb at that point extends sufficiently close to the filament to utilize the high concentration of light rays emanating therefrom. This depression may be spherical in contour or of any shape which in combination with the refracting medium will produce the desired lens effect. The refracting medium comprises a large body of liquid 12 received in a chamber 14, having a cover 16 upon which the lamp is supported. A portion of the refracting medium opposite the filament is confined between the depression 11 and a transparent lens member 18 to determine a lens shaped portion of the refracting medium. The lens member 18 is secured to a mounting sleeve 20 by screws 22 and the sleeve is threaded on a nipple 24 of the chamber. The lens member 18 may be of any desired shape to cooperate with the depression 11 depending on the refracting action desired to be imparted to the rays so that the refracting effect of any of the well known types of lenses may be obtained. The incandescent lamp is supported in the chamber by means of a pair of upstanding brackets 30 secured to the cover 16 and supporting a lamp socket which is indicated generally at 32. The lamp extends downwardly from the socket through an opening 34 in the cover and is sealed to prevent leakage of fluid by means of a flexible gasket 36. The lamp may be placed in position by removing the cover and inserting the bulb in the socket through the opening 34 so that the bulb is firmly seated against the gasket 36 and the cover then replaced on the chamber. The chamber is provided with inlet and outlet nipples 38 and 40 to provide for filling with the liquid. The nipples may be closed by caps 42 and 44 as shown in Fig. 1 or may be connected with a fluid supply to maintain a forced circulation through the chamber.

The portion of liquid included between the depression 11 of the bulb and the lens member 18 comprises a lens acting to refract the light rays emitted from the filament. The body of fluid 12 which in the total is large compared to that portion included between the depression 11 and the lens member 18 acts as a cooling fluid not only to absorb the heat emanating from the filament in all directions, but also to set up a natural circulation by convection currents to disperse the more intense heat generated in the lens portion of the liquid body to all portions of chamber where it may be dissipated by radiation. The provision for a continuous forced circulation through the chamber is useful where the lamp is of such power that the generated heat can not be readily dissipated by the natural circulation within the chamber. Inasmuch as the liquid is in direct contact with the external wall of the bulb, the reflection losses usually incident to passage of light across transition surfaces between media of widely different refractive indices are avoided.

The apparatus shown in Fig. 2 is especially useful for the generation and utilization of the rays of the invisible spectrum which are of high therapeutic value. The construction is similar to that illustrated in Fig. 1 with the exception that an applicator 50 is substituted for the lens member 18. The incandescent lamp may be operated so as to give off rays which are rich in ultra-violet light by operating the filament slightly above rated voltage as described in the co-pending application of Boerstler, Serial No. 33,446, filed May 28, 1925. The refracting effect of the liquid medium received in the depression 11 close to the filament serves to give a high concentration of such rays and the applicator 50 extending into the fluid medium collects the rays and conducts them to any desired point. The applicator is supported by means of a threaded sleeve 52 which is received on the nipple 24. A gasket 54 is secured between the sleeve 52 and a cooperative sleeve 56, and by closely engaging the applicator 50 prevents leakage of liquid. In order to secure maximum therapeutic volume of the invisible rays, both the applicator 50 and the envelope of the lamp are preferably of a material, such as quartz or borosilicate glass, which possesses marked conductive properties toward the invisible spectrum. Moreover the fluid medium 12 may be of a solution which is selectively transparent to these rays so that the longer visible rays and the infra-red heat rays may be filtered out. A typical solution which possesses such selectivity is an aqueous solution of copper sulphate.

The lamp shown in Figs. 4 and 5 comprises an incandescent lamp similar to that previously described which is formed with a depression 11 extending adjacent and near to the filament. In order that the rays emitted from the opposite side of the filament may not be lost a reflector 60 is provided which serves to cause a further increase in light concentration on the refracting medium received within the depression. A device of this type is useful, not only in large projectors but also in therapeutic work to obtain great volume of ultra violet rays. The reflector is preferably of nickel which has a high melting point and which is also highly reflective to rays of the invisible spectrum. Its position within the bulb insures minimum diminution of intensity of the short rays, which are thereby required to pass only once through the wall of the bulb. Another modified form of lamp is shown in Fig. 6 wherein the rays of light are to be directed axially of the lamp. In this form, the depression 110 is formed in the end of the lamp and extends in an axial direction toward the filament. This lamp, when supplied with a refracting substance in the depression, is especially suitable for some types of searchlights where constructional details require a socket mounting in axial alignment with the desired direction of the beam of light.

The apparatus shown in Fig. 7 illustrates the application of the present invention to a form of lamp in which the source of light consists of a carbon arc. The arc is formed between carbon electrodes 62 and 64 which are completely surrounded for a considerable portion of their length by the refracting liquid 140 which is confined within a chamber container 66. The container is formed opposite the arc with lens portions 68 and 70 between which the fluid is confined to determine a lens at a position of great intensity of light. The container may be entirely of glass or quartz or may be of metal with transparent inserts for the lens members 68 and 70. As in the construction previously described, the container is formed with inlet and outlet nipples 72 and 74 which may be connected, if desired, through pipes 76 and 78 to effect a forced circulation of fluid through the container.

It will be apparent that the present invention provides a projection apparatus, by which the maximum intensity of the light emanating from the source may be utilized, and in no case with a destructive generation of heat. The apparatus is simple and easily constructed. Furthermore, it is readily adapted to different uses, in that the refracting characteristics may be readily altered by a change in the transparent lens members which determine the contour of the refracting medium, and the selective transparency or filtering action may be conveniently altered by a substitution of various liquids.

Having thus described the invention, what is claimed is:

1. An apparatus for projecting light rays comprising an incandescent lamp having a bulb formed with a depression extending close to the filament of the lamp in a position of great intensity of light, a chamber in which the lamp is supported, and a liquid medium received in the chamber and in direct contact with the bulb and forming with the depression of the bulb a lens for focusing the rays of light emitted by the lamp.

2. An apparatus for projecting light rays comprising an incandescent lamp having a transparent bulb formed with a lens shaped depression extending close to the filament of the lamp in a position of great intensity of light, a fluid cooling medium surrounding the bulb and in direct contact with the wall thereof, and a transparent lens member cooperating with the depression in the bulb whereby the fluid between the depression and the transparent lens member forms a lens for focusing the light rays emitted from the incandescent lamp.

3. An apparatus for projecting light rays comprising an incandescent lamp having a transparent bulb formed with a lens shaped depression extending close to the filament of the lamp in a position of great intensity of light, a fluid cooling medium surrounding the bulb and in direct contact with the wall thereof, and a transparent lens member cooperating with the depression in the bulb whereby the fluid between the depression and the transparent lens member forms a lens for focusing the light rays emitted from the incandescent lamp, and a reflector arranged on the opposite side of the source of light from the depression for concentrating the light rays on the lens.

4. An apparatus for projecting light rays comprising a chamber, an incandescent lamp received within the chamber having a bulb provided with a depression extending close to the filament in a position of great intensity of light, a fluid cooling medium received in the casing and in direct contact with the wall of the bulb and having selective transparency toward a portion of the spectrum, and a transparent member in the casing cooperating with the depression of the bulb to define a lens shaped portion of the liquid medium.

5. An apparatus for projecting light rays comprising an incandescent lamp having a transparent bulb formed with a depression, a fluid cooling medium surrounding the bulb in direct contact with the wall thereof and received in the depression to form a lens, and a reflector having high reflection properties toward the invisible spectrum received within the bulb.

6. An apparatus for projecting light rays comprising a source of light consisting of an incandescent lamp having its bulb provided with a depression extending close to the filament of the lamp in a position of great intensity of light, a casing containing a fluid cooling medium surrounding the bulb, the cooling medium being in direct contact with the wall of the bulb, an applicator for directing and conducting the rays emitted by the source to a desired point and arranged opposite to the depression of the bulb, the fluid included between the depression and the applicator forming a lens for the rays of light emitted by the source.

7. An apparatus for projecting light rays comprising an incandescent lamp having a filament and a bulb provided with a lens shaped depression extending close to the filament in a position of great intensity of light, and a fluid cooling and refracting medium surrounding the bulb in direct contact with the wall thereof and filling the depression to form a lens.

In testimony whereof I have signed my name to this specification.

EDWARD W. BOERSTLER.